United States Patent
McCulloch et al.

(10) Patent No.: US 12,278,372 B2
(45) Date of Patent: Apr. 15, 2025

(54) DISPERSANT

(71) Applicant: Croda International Plc, Goole (GB)

(72) Inventors: Louise Maria Bell McCulloch, Goole (GB); Joshua Michael Moore, Goole (GB); Michael Andrew Oakley, Goole (GB)

(73) Assignee: Croda International Plc, East Yorkshire (GB)

( * ) Notice: Subject to any disclaimer, the term of this patent is extended or adjusted under 35 U.S.C. 154(b) by 564 days.

(21) Appl. No.: 17/634,397

(22) PCT Filed: Aug. 13, 2020

(86) PCT No.: PCT/EP2020/072714
§ 371 (c)(1),
(2) Date: Feb. 10, 2022

(87) PCT Pub. No.: WO2021/028519
PCT Pub. Date: Feb. 18, 2021

(65) Prior Publication Data
US 2022/0302456 A1 Sep. 22, 2022

(30) Foreign Application Priority Data
Aug. 15, 2019 (GB) .................................. 1911721

(51) Int. Cl.
*C08G 63/91* (2006.01)
*H01M 4/04* (2006.01)
(Continued)

(52) U.S. Cl.
CPC ............ *H01M 4/622* (2013.01); *C08G 63/91* (2013.01); *H01M 4/04* (2013.01); *H01M 4/131* (2013.01); *H01M 4/1391* (2013.01)

(58) Field of Classification Search
CPC .............................. C08G 63/91; H01M 4/622
See application file for complete search history.

(56) References Cited

U.S. PATENT DOCUMENTS

| 2006/0189502 A1† | 8/2006 | Thetford |
| 2017/0237114 A1† | 8/2017 | Makino |
| 2017/0274335 A1† | 9/2017 | Favresse |

FOREIGN PATENT DOCUMENTS

| EP | 0158406 | † 10/1985 |
| EP | 0158406 A1 | 10/1985 |

(Continued)

OTHER PUBLICATIONS

Chinese Office Action for Chinese Application No. 202080057232.4, dated Dec. 4, 2023 with translation, 15 pages.
(Continued)

*Primary Examiner* — Mark S Kaucher
(74) *Attorney, Agent, or Firm* — Buchanan Ingersoll & Rooney PC

(57) ABSTRACT

The present invention relates to dispersants comprising a polyester derived from a plurality of poly(carbonylalkyleneoxy) chains (and optionally a fatty acid) and an amine, wherein said dispersants have an acid value of less than 15 mgKOH/g. The dispersants as described herein provide desirable viscosity profiles when in use. More especially some embodiments provide improved compatibility with certain solvents in dispersions, and/or are particularly suitable for use in battery systems.

23 Claims, 4 Drawing Sheets

Figure 1:
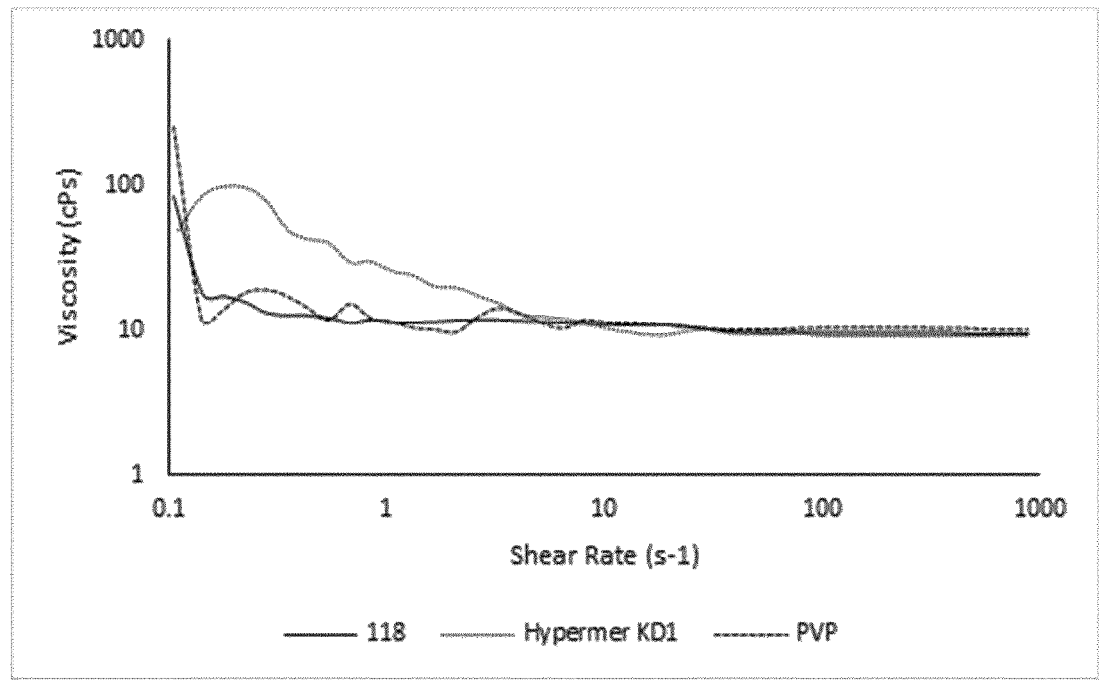

(51) Int. Cl.
  *H01M 4/131*    (2010.01)
  *H01M 4/1391*   (2010.01)
  *H01M 4/62*     (2006.01)

(56)              References Cited

FOREIGN PATENT DOCUMENTS

| | | |
|---|---:|---:|
| EP | 0690745 A1 | 1/1996 |
| JP | 05271593 A | 10/1993 |
| JP | 2009176721 A | 8/2009 |
| JP | 2013058389 A | 3/2013 |
| JP | 2013209523 A | 10/2013 |
| JP | 2014029018 A | 2/2014 |
| WO | 9302131 A1 | 2/1993 |
| WO | 9421368 A1 | 9/1994 |

OTHER PUBLICATIONS

International Search Report and Written Opinion for International Application No. PCT/EP2020/072714, dated Nov. 11, 2020, 11 pages.
Office Communication re: Third Party Submission for U.S. Appl. No. 17/634,397, dated Dec. 21, 2022, 2 pages.
Third Party Submission Under 37 CFR 1.290 for U.S. Appl. No. 17/634,397, dated Dec. 21, 2022, 48 pages.
Zhang et al., "A Nitrogen-Containing All Solid-State Hyperbranched Polymer Electrolyte for Superior Performance Lithium Batteries", Journal of Materials Chemistry A, 2019, vol. 7, pp. 6801-6808.
Korean Notice of Third Party Submissions for Korean Application No. 10-2022-7008028, dated Jul. 31, 2023, 2 pages.

† cited by third party

DISPERSANT

CROSS-REFERENCE TO RELATED APPLICATIONS

This application is a U.S. National Phase application of PCT International Application No. PCT/EP2020/072714, filed Aug. 13, 2020, which claims the benefit of GB Application No. 1911721.7, filed Aug. 15, 2019, both of which are incorporated by reference herein in their entireties.

The present invention relates to dispersants comprising a polyester derived from a plurality of poly(carbonylalkyleneoxy) chains (and optionally a fatty acid) and an amine, wherein said dispersants have an acid value of less than 15 mgKOH/g. The dispersants as described herein possess improved viscosity profiles when in use. More especially some embodiments provide improved compatibility with certain solvents in dispersions, and/or are particularly suitable for use in battery systems.

Conductive carbon is a common component of battery systems, amongst other applications. Conductive carbon is available in different forms, and notably spherical and nanotube forms are utilised in battery systems. Use of conductive carbon in battery systems is, however, problematic since it is difficult to achieve the homogenous dispersions of this material necessary for achieving sufficient battery energy density and acceptable rates of electrode wastage. One way of improving the homogeneity of dispersions of conductive carbon is to utilise a dispersant. However, conductive carbons are challenging to disperse, especially as compared to pigment carbons. This is because conductive carbons are not functionalised; functionalisation (as apparent in pigment carbons) allows dispersants to easily anchor to the carbon material, facilitating dispersibility. As such, one suggested approach to achieve better dispersibility of conductive carbon has been to functionalise the conductive carbon, however, such functionalisation results in a loss of conductivity which is not desirable.

In addition to conductive carbon, other materials may need to be dispersed in battery systems. Such other materials to be dispersed may include, but are not limited to, lithium cobalt oxide (LCO), lithium ferro phosphate (LFP), lithium nickel manganese cobalt oxide (NMC), lithium manganese oxide (LMO) and lithium nickel cobalt aluminium oxide (NCA). The aforementioned materials are those dispersed in traditional battery systems.

Presently, alternative battery materials are sought and suggested based on magnesium and sodium oxides and salts; these materials will also require to be dispersed in battery systems.

Selection of dispersants suitable for use in battery systems has proven difficult, although a wide variety of dispersants are known for other applications. This may be due to the fact that flow of materials and/or current through the battery system is necessary and not all types of dispersant allow for such flow to be achieved. Furthermore, some dispersants are only suitable for use with specific types and grades of conductive carbon material, undesirably resulting in battery system formulation constraints. Polyvinylpyrrolidone (PVP) is a known dispersant which is a commonly utilised in battery systems, yet even PVP has limitations in this application area and so alternative dispersants are desirably sought.

In current battery systems particulate active materials (including conductive carbon) are commonly dispersed in a solvent based continuous phase, and so any dispersant should also be compatible with the solvent chosen. At present n-methyl-2-pyrrolidone (NMP) is a common lithium ion battery system solvent. However, NMP has associated environmental concerns and hence it is desirable to replace its use with alternative solvent systems. As such, it is also desirable to provide alternative dispersants that will work well across a range of solvent systems.

A class of dispersants comprising a poly(carbonylalkyleneoxy) chain in an amine carrier are known and described in published patent application number EP 0 158 406. However, the materials disclosed therein are found to have unsatisfactory viscosity profiles when in use in some applications, and additionally suffer from problems associated with crystallising out of some solvents when below ambient temperature. The dispersants made in accordance with the teaching of this document includes undesirable salts, since the method of manufacturing such materials promotes salt formation. In accordance with the present invention, the presence of salts in a dispersant material has been found to be a major contributory factor in undesirable viscosity increases encountered when such dispersants are employed to disperse conductive carbon, as described more fully below, making the dispersants of this prior art teaching poorly suited to use in battery systems (and other applications), where viscosity increasing or thickening of the dispersed system would be unacceptable or undesirable.

Use of PVP as a dispersant in battery systems is currently common place. However, use of PVP in battery systems has particular drawbacks, which the present invention looks to overcome. PVP is a limiting material on the energy density that can be achieved for a battery system since its use has an undesirable viscosity increasing action (and this is especially evident in NMP solvent based systems). This viscosity increase limits the amount of PVP that can be utilised in the battery system and this results in a corresponding limitation on the amount of conductive carbon (or other active material to be dispersed) that can be provided in the battery system. As such, the replacement of PVP with alternative dispersant which provides a lower viscosity profile when in use is desirable; this will allow for improvements in energy density, which will facilitate improvements in current battery systems.

The dispersants of the present invention have been found to provide reduced salt, or salt free, dispersants which allow for salt tolerance in the compositions or formulations incorporating the dispersants. In particular, compositions or formulations which utilise the dispersants of the present invention avoid undesirable viscosity modification as compared to known dispersants which are not salt tolerant. More especially, undesirable composition or formulation thickening when in use is avoided. One application area where known dispersants lead to undesirable viscosity modification in compositions or formulations is the area of battery systems, usage in battery systems represent a very challenging environment for dispersants and as such are chosen to highlight the benefits of the present invention in more detail. However, the skilled person in the area of dispersants will appreciate that such dispersants have wider utility in applications beyond battery systems.

More especially, it has been surprisingly found that the dispersants as described herein possess improved viscosity profiles when in use. Additionally, they have improved compatibility with NMP solvent based systems, rendering them particularly suitable for use as dispersants in battery systems.

According to the present invention there is provided a dispersant comprising a polyester derived from a plurality of poly(carbonylalkyleneoxy) chains (and optionally a fatty acid), and an amine, wherein said dispersant has an acid value of less than 15 mgKOH/g.

In accordance with an alternative embodiment of the present invention there is provided a method of manufacturing the dispersant described herein.

There is also provided a dispersion comprising a continuous phase, a particulate to be dispersed and a dispersant as described herein.

Furthermore, there is provided a battery system comprising a dispersion as described herein.

Additionally, there is provided use of a dispersant as described herein in a battery system.

As such, in accordance with one embodiment of the present invention there is provided a dispersant comprising:
a plurality of poly(carbonylalkyleneoxy) chains, and
an amine,
said dispersant having an acid value of less than 15 mgKOH/g.

Acid value, sometimes referred to as acid number, is a measure of the amount of potassium hydroxide (KOH) required to neutralise 1 gram (g) of a chemical substance of interest. The AOCS 'Te-1a-64: Acid Value of Fatty Acids test method provides a suitable method for testing the present materials.

The dispersant of the present invention has an acid value of less than 15 mgKOH/g. Preferably the dispersant has an acid value of less than 10 mgKOH/g, more preferably less than 5 mgKOH/g, even more preferably less than 2 mgKOH/g and most preferably less than 1 mgKOH/g. Dispersants having an acid value of between 0.2 and 2 mgKOH/g, or more preferably 0.4 and 1.2 mgKOH/g have been found to be particularly suitable for use as dispersants in battery systems.

Preferably the dispersant polyester of the present invention comprises a plurality of poly(carbonylalkyleneoxy) chains in which the alkylene group contains between 3 and 12 carbon atoms. More preferably the alkylene group contains between 4 and 8 carbon atoms, and most preferably the alkylene group contains between 5 and 7 carbon atoms.

The plurality of poly(carbonylalkyleneoxy) chains of the present dispersant polyester may be formed from two or more poly(carbonylalkyleneoxy) chains with differing alkylene group chain lengths. Alternatively, and more preferably, the poly(carbonylalkyleneoxy) chains of the present dispersants are formed from one type of alkylene group i.e. of a single chain length; more consistency in use can be expected where carbon chains of a single length are provided.

Most suitably the dispersant polyester comprises a plurality of poly(carbonylalkyleneoxy) chains in which the alkylene group is a hydroxyhexanoic acid derivative, and more especially a 6-hydroxyhexanoic acid derivative. It is desirable that the dispersant comprises a plurality of poly(carbonylalkyleneoxy) chains being a poly(6-hydroxyhexanoate), which is derived from ε-caprolactone; the benefit of using such derivatives is their commercial availability and cost.

The dispersant polyester may preferably comprise a fatty acid. Accordingly, a fatty acid is optionally included in the method of manufacturing the dispersant, where the presence of the fatty acid in the method of manufacture acts to control the plurality of poly(carbonylalkyleneoxy) chains chain length, as such it may provide manufacturing and quality control advantages. However, in some alternative embodiments the dispersant does not comprise a fatty acid, the absence of the fatty acid acts to limit the acid introduced to the dispersant manufacturing process, which in turns limits the amount of acid which must be removed or neutralised to provide a dispersant with an acid value as defined herein. When present in the dispersant the fatty acid may be saturated or unsaturated. The fatty acid may preferably contain a medium fatty acid chain. Preferably the fatty acid chain contains between 6 and 18 carbons. More preferably the fatty acid chain contains 10 to 16 carbons. Even more preferably the fatty acid may be selected from one or more of the following: oleic acid, caproic acid, lauric acid, stearic acid and palmitic acid. Most preferably the fatty acid is lauric acid.

Preferably the polyester is derived from a ratio of the plurality of poly(carbonylalkyleneoxy) chains to the fatty acid of between 4:1 to 15:1, more preferably the ratio is between 5:1 and 13:1, and most preferably the ratio is between 8:1 and 12:1. The ratio of the polyester derived from the plurality of poly(carbonylalkyleneoxy) chains to the fatty acid dictates the length of the poly(carbonylalkyleneoxy) chains in the polyester material, with a higher relative proportion of fatty acid resulting in shorter polyester chains. It has been found that relatively longer polyester chain lengths, arising from the preferred ratios stated here, have improved thermal stability.

The dispersant polyester comprises an amine. Suitably the amine may contain one or more of a primary, secondary or tertiary amine. Preferably the amine is a polymeric amine, and more preferably the polymeric amine is a poly(alkylenimine). Most preferably the polymeric amine is polyethylenimine. Suitably the polymeric amine may have a weight average molecular weight in the range of 1000 to 50000, more preferably 2000 to 30000. Most preferably the polymeric amine has a weight average molecular weight up to 25000, this is due to the fact that commercially available polymeric amines with molecular weights over 25000 are supplied as a solution in water and this adds to the complexity of manufacture of the dispersant as a water removal step may be required. As such, a particularly preferred polymeric amine may have a weight average molecular weight in the range of 1000 up to 25000, more preferably 2000 up to 25000, for ease of manufacturing benefits.

Where the dispersant contains relatively low levels of amine it may be that there is not sufficient amine present to neutralise acid present during the dispersant manufacturing process. Although other materials may be introduced to achieve neutralisation of the acid groups of the polyester plurality of poly(carbonylalkyleneoxy) chains it is particularly preferred that neutralisation be achieved mainly, or solely, via the reaction with the amine during the manufacturing process of the dispersant. As such, suitably the dispersant comprises at least 1 wt % (weight percent) amine. Preferably the dispersant comprises at least 2 wt % amine. More preferably the dispersant comprises at least 5 wt % amine, even more preferably the dispersant comprises at least 7 wt % amine. On the other hand, the presence of relatively high levels of amine is believed to adversely affect the performance of the dispersant. As such, the dispersant may suitably comprise no more than 35 wt % amine, preferably no more than 30 wt % amine, more preferably no more than 15 wt % amine, and most preferably no more than 10 wt %. Therefore, the dispersant may advantageously comprise about, 1 to 30 wt % amine, preferably 2 to 15 wt % amine, more preferably 5 to 10 wt % amine, and most preferably about 7 wt % amine, to achieve a good balance between performance and acid neutralisation in the absence of additional neutralisation materials being introduced.

Additionally, or alternatively, the dispersant of the present invention may also comprise an acid scavenger. The acid scavenger may be included to react with any undesirable acid groups still present in the dispersant post reaction with the amine. A suitable acid scavenger may be selected from the following, alkaline metal soaps, and epoxy esters. Preferably the acid scavenger is a mono epoxy ester as such materials are found to be advantageously compatible with active materials present in battery systems. When present the dispersant may comprise between 1 and 20 wt % of the acid scavenger, preferably 5 to 15 wt %, and more preferably 8 to 12 wt %. It is particularly preferable that the dispersant does not comprise an acid scavenger, and this embodiment is particular preferred when the dispersant also does not comprise a fatty acid.

The simple act of adding a basic material to counter balance the acid groups present in the dispersant material has not been found to provide adequately improved properties to render the dispersants suitable for use in battery systems; it is believed that the acid content of the dispersant must be removed or immobilised to achieve the desirable properties realised when using the dispersant of the present invention. More especially, it has been found that the incorporation of caustic soda to neutralise the acid groups present in hitherto known dispersants is not an effective route to obtain materials which avoid undesirable viscosity increases (dispersion thickening) when in use. Why addition of a basic material to neutralise any acid groups does not provide desirable results is not well understood, but it may be that the production of neutralisation reaction salts in the dispersant is also contributing to the dispersion thickening effect. Within the dispersant the polyester poly(carbonylalkyleneoxy) chains and the amine are linked via amide and/or amide salt bridging groups formed during the reaction between at least one amino group present in the amide and at least one carbonyl group present in the poly(carbonylalkyleneoxy). It is believed that the presence of these amide and/or amide salt bridging groups contribute to the problems associated with the unsuitable viscosity profiles of the dispersants of the prior art. In addition, removal of amide salt groups is thought to be particularly important to avoid the dispersion thickening effect observed when used with certain solvents including NMP.

Additionally, or alternatively, the dispersants have an amine value of less than 30 mgKOH/g, preferably less than 28 mgKOH/g and most preferably less than 26 mgKOH/g. Amine value, is a measure of the equivalent amount of potassium hydroxide (KOH) to the amine alkalinity present in 1 gram (g) of a chemical substance of interest. The AOCS Tf-1b-64: Total amine value of fatty amines, indicator method provides a suitable method for testing the present materials. Reductions in amine value have been found to correspond to improvements in a dispersants ability to disperse particulate materials. As such, a dispersant with both a low acid value and a low amine value may be particularly preferred.

Furthermore, it has been found that the dispersants of the present invention have good thermal stability. This renders the materials well suited to use in battery systems where higher temperatures may be encountered during use of the battery. Suitably, the dispersants have a weight loss of less than 20% at 350° C. Weight loss may be assessed in accordance with standard test methods ASTM E2550 or/and ISO 11358-1.

Additionally, or alternatively, the dispersants preferably have a crystallisation temperature (Tc) peak temperature of less than 20° C. (as measured by differential scanning calorimetry, DSC), more preferably less than 15° C., and most preferably less than 10° C. The crystallisation peak temperature is thought to be related to the amount of unreacted poly(carbonylalkyleneoxy) chains present in the dispersant, with higher crystallisation peak temperatures being indicative of higher levels of unreacted poly(carbonylalkyleneoxy) chains. The low crystallisation temperatures of the present dispersant materials are an indication of the thermal stability of the dispersants of the present invention at ambient temperatures.

Additionally, or alternatively, the dispersants have a melting temperature (Tm) peak temperature of less than 45° C. (as measured by DSC), preferably less than 40° C. The melting temperature of the present dispersants render them easy to handle and utilise for use in dispersions. DSC is a widely employed method for characterisation and analysis of polymeric materials. DSC may be assessed in accordance with standard test methods ASTM D3418 or/and ISO 11357-3.

Additionally, there is provided a method of manufacturing a dispersant as described above. The method of manufacturing a dispersant comprising a plurality of poly(carbonylalkyleneoxy) chains, optionally a fatty acid, and an amine, comprises the following steps:
  a) preparing a polyester from the polymerisation reaction of a plurality of poly(carbonylalkyleneoxy) chains, and optionally a fatty acid,
  b) providing an amine, and allowing the polyester of step a) to react with the amine to form an intermediate reaction product, and,
  c) reducing the acid value of the intermediate reaction product of step b).

All of the preferable features described above in relation to the individual constituents of the dispersant product, and the final dispersant product its self, apply equally to the materials utilised in the method described here, as such, in step c) the acid value of the intermediate reaction product is reduced sufficiently to provide the final desired low acid value dispersant product as defined above.

The method steps a), b) and/or c) may be performed simultaneously or sequentially. More especially, steps b) and c) are preferably performed simultaneously. Furthermore, in the case where no optional fatty acid is present in step a) then step a) and step b) may most preferably be performed simultaneously.

Suitably, step a) may be performed in a first reaction vessel, and step b) may be performed subsequently in a second reaction vessel, such that once the polymerisation reaction of step a) is complete the first reaction vessel may optionally be cooled and the formed polyester discharged to the second reaction vessel for performing step b) of the method; in this case the amine may be provided in the second reaction vessel prior to or subsequent to introduction of the polyester, or alternatively the two reactants may be introduced simultaneously. Alternatively, step b) may preferable be performed utilising the same (first) reaction vessel; in this case it is not necessary that the reaction vessel be cooled, and instead the amine may be introduced to the reaction vessel to react with the polyester formed in step a). However, it may be that the polyester of step a) be discharged to a second reaction vessel for subsequent performance of step b) (and simultaneously or subsequently step c)) as this allows for faster process through-put.

Preferably the polymerisation reaction in step a) may be performed at a temperature between 130° C. and 250° C., and more preferably between 150° C. and 200° C.

In step a) the polymerisation reaction may suitably be performed in the presence of a polymerisation catalyst. Suitable polymerisation catalysts may be organic or inorganic in nature. Preferably the polymerisation catalyst may be selected from the following; titanium (IV) butylate, zirconium (VI) butoxide, zinc acetate and toluenesulfonic acid. Titanium (IV) butylate and zirconium (VI) butoxide are particularly preferred polymerisation catalysts for use in the present methods.

Suitably, the polymerisation reaction in step a) may have a reaction time of between 4 and 20 hours. Where the polymerisation reaction is performed in the absence of a polymerisation catalyst suitable reaction times may be between 15 and 20 hours, preferably between 17 and 19 hours. Alternatively, when the polymerisation reaction is performed in the presence of a polymerisation catalyst a suitable reaction time may be between 4 and 12 hours, preferably between 6 and 10 hours. As such, the presence of a catalyst is particular preferred to reduce the time needed to perform the reaction of step a).

Suitably the polymerisation reaction is performed in an inert atmosphere, and preferably under nitrogen. It is also preferred that a nitrogen purge be performed prior to the polymerisation reaction being performed to remove air from the reaction vessel.

Suitably the polyester prepared in step a) comprises a plurality of poly(carbonylalkyleneoxy) chains in which the alkylene group contains between 3 and 12 carbon atoms. More preferably the alkylene group contains between 4 and 8 carbon atoms, and most preferably the alkylene group contains between 5 and 7 carbon atoms. Most suitably the polyester comprises a plurality of poly(carbonylalkyleneoxy) chains in which the alkylene group is a hydroxyhexanoic acid derivative, and more especially a 6-hydroxyhexanoic acid derivative. It is desirable that the dispersant comprises a plurality of poly(carbonylalkyleneoxy) chains being a poly(6-hydroxyhexanoate), which is derived from ε-caprolactone.

Preferably the polyester prepared in step a) also comprises the optional fatty acid. The fatty acid may be saturated or unsaturated. The fatty acid may preferably contain a medium fatty acid chain. Preferably the fatty acid chain contains between 6 and 18 carbons. More preferably the fatty acid chain contains 10 to 16 carbons. Even more preferably the fatty acid may be selected from one or more of the following: oleic acid, caproic acid, lauric acid, stearic acid and palmitic acid. Most preferably the fatty acid is lauric acid. As eluded to above, the presence of the fatty acid allows for control of the plurality of poly(carbonylalkyleneoxy) chains chain lengths within the polyester prepared in step a). When the optional fatty acid is included in the preparation of the polyester of step a) it is preferable that step b) is performed subsequently to step a). i.e. steps a) and b) are preferably performed sequentially when a fatty acid is utilised in the method of manufacturing the dispersant.

As described above, when the fatty acid is utilised in the method, preferably the polyester prepared in method step a) results in a polyester having a ratio of the plurality of poly(carbonylalkyleneoxy) chains to the fatty acid of between 4:1 to 15:1, more preferably the ratio is between 5:1 and 13:1, and most preferably the ratio is between 8:1 and 12:1.

Suitably the amine in step b) may contain one or more of a primary, secondary or tertiary amine. Preferably the amine is a polymeric amine, and more preferably the polymeric amine is a poly(alkylenimine). Most preferably the polymeric amine is polyethylenimine. Suitably the polymeric amine may have a weight average molecular weight in the range of 1000 to 50000, more preferably 2000 to 30000. As alluded to above most preferable the polymeric amine has a weight average molecular weight up to 25000, this is due to the fact that commercially available polymeric amines with molecular weights over 25000 are supplied as a solution in water. As such, a particularly preferred polymeric amine may have a weight average molecular weight in the range of 1000 up to 25000, more preferably 2000 up to 25000, for ease of manufacturing.

Optionally, the method may comprise a water removal step. This is preferable when the polymeric amine utilised in step b), is provided as a solution in water, as is typical for commercially available products where the amine has a weight average molecular weight over 25000. However, such a method is less preferred.

Suitably, step b) may be performed at a temperature between 130° C. and 240° C., preferably between 150° C. and 220° C., and more preferably between 170° C. and 190° C.

In the present method the reduction in acid value of the intermediate reaction product in step c) may be achieved by any suitable means. In particular, in step c) the reduction in acid value of the intermediate reaction product may be achieved by allowing the reaction of step b) to be performed for a sufficiently long time that the amine present is able to fully react with the polyester of step a) resulting in the elimination of any salt or acid formation. Additionally, or alternatively, an acid scavenger may be employed to achieve the reduction in acid value of step c).

Preferably the reduction in acid value is achieved by allowing step b) to be performed for a sufficiently long time. In this case, step b) may have a reaction time of between 14 and 24 hours, more preferably between 16 and 22 hours, and most preferably between 18 and 22 hours, during which time the acid value of the intermediate reaction product is allowed to drop to the desirable atypical low level.

Optionally, during method step c) the acid value of the product is monitored and may be terminated once the desired acid value has been obtained. Termination of method step c) may be achieved by cooling the reactants. Cooling the reactants will slow the reaction until they are below the reaction activation temperature at which point the reaction of method step c) will stop. As such, preferably method step c) includes the step of monitoring acid value continuously or intermittently. Where the acid value is to be monitored intermittently it is preferable to measure the acid value of the product/reactants at a time interval of between 15 minutes and one hour, and conveniently at a time interval of 30 minutes.

Alternatively, the reaction stops naturally when no free acid remains to react. As such, for very low acid value materials reaction method step c) does not need to be monitored, and instead the reaction of step c) merely needs to be allowed sufficient time to allow the reaction to react all free acid present in the original reactants.

Once the acid value has reached the desired low level step c) of the method may be terminated, and the product (optionally cooled) discharged from its reaction vessel. The product is discharged in a state suitable for use as a dispersant without further modification or processing.

Suitably, step c) is performed in situ in the same reaction vessel utilised to perform the reaction of step b), such that there is no requirement to transport the intermediate reaction product to a further reaction vessel to allow the reduction in acid value to be performed, although for higher through put processing it may be desirable to discharge the intermediate reaction product from the reaction vessel of step b) to a further reaction vessel for performing step c); this would allow the reaction vessel of step b) to be recharged with fresh polyester and amine reactants in a shorter time frame, hence providing a higher through-put method.

Alternatively, or additionally, as alluded to above, in step c) the reduction in acid value of the intermediate reaction product may be achieved (or assisted) via the introduction of an acid scavenger. Introduction of an acid scavenger may be utilised to reduce the time required to obtain the desired acid value in the absence of the acid scavenger. However, such a method of introducing an acid scavenger is less preferred, as the introduction of the acid scavenger may render the final dispersant product less suitable for use in some applications.

The present invention also provides a dispersion comprising a continuous phase, a particulate to be dispersed and a dispersant as described above.

The dispersant of the present invention are believed to have reduced salt content, and even be salt free in some embodiments, providing improved salt tolerance properties when in use when compared to similar hitherto known materials. This allows the dispersants of the present invention to be used in applications where problems associated with gelling, thickening or viscosity increase due to the presence of salts have been identified. As a result of this benefit, higher loadings of materials to be dispersed can be achieved in the dispersions of the present invention, as further described below.

Preferably the continuous phase comprises a solvent. The solvent may be polar or non-polar. The solvent may be an organic solvent or an inorganic solvent. More preferably the solvent is selected from the following: n-methyl-2-pyrrolidone (NMP), dimethyl sulfoxide (DMSO), and dihydrolevoglucosenone (also known as Cyrene); such solvents are particularly useful in battery systems. However, for other applications the continuous phase solvent may also be selected from alcohols (in particular methanol, ethanol and terpineol), hydrocarbons (in particular toluene), and ketones (in particular methyl ethyl ketone).

In one particularly preferred embodiment the solvent is NMP. The dispersants of the present invention are particularly well suited to use in NMP based solvent systems as they avoid the undesirable thickening effect observed with hitherto known dispersants.

Suitably, the particulate to be dispersed is a particulate battery active material. Preferably the particulate battery active material is selected from one or more of the following: conductive carbon, lithium nickel manganese cobalt oxide (NMC, $LiNi_xMn_yCo_zO_2$), lithium manganese oxide (LMO, $LiMn_2O_4$), lithium iron phosphate (LFP, $LiFePO_4$), lithium cobalt oxide (LCO, $LiCoO_2$), and lithium nickel cobalt aluminium oxide (NCA, $LiNiCoAlO_2$).

The dispersion preferably comprises an amount of particulate to be dispersed between 0.1 wt % and 99.9 wt % more preferably 0.5 wt % and 99 wt %, and most preferably 1 wt % and 95 wt %. More especially, as will be appreciated by the skilled person, the amount of particulate to be dispersed by weight % in the overall dispersion depends largely on the density of the particulate to be dispersed. As such, in dispersions useful for battery systems, the dispersion may suitably comprise between 1 wt % to 19.9 wt % conductive carbon, preferably 5 wt % to 18 wt % and most preferably 7 wt % to 15 wt %, however, additionally the dispersion may comprise 60 wt % to 80 wt % lithium containing material. As such, for battery system applications the dispersion may preferably comprise a total amount of particulate to be dispersed between 60 wt % and 99.9 wt % of the dispersion. One of the advantages of the present invention is that greater amounts of particulate to be dispersed may be included without undesirable gelling or viscosity increasing problems arising as compared to hitherto known dispersants.

The dispersion may comprise additional additives. Such additional additives may include one or more of binders, adhesion promoters, wetting agents, and corrosion inhibitors which may render the dispersions more suitable for use in a battery system. Preferably the dispersion comprises a binder, and suitable binders are known and include polyvinylidene difluoride (PVDF), cellulosic derived materials, rubbers (e.g. SBR, hydrogenated nitrile), polyacrylonitrile, latex and polyacrylic acid amongst others. These additional additives are not battery active materials.

Furthermore, there is provided a battery system comprising a dispersion as described herein.

The battery system may be packaged as a cylindrical cell, a button or coin cell, a prismatic cell or a pouch cell, depending on its intended use.

Preferably the battery system is a lithium-ion battery system.

The battery system may comprise additional additives. Such additional additives may include one or more of binders, adhesion promoters, wetting agents, and corrosion inhibitors.

Additionally, there is provided use of a dispersant as described herein in a battery system. Preferably the dispersant is used in the cathode of the battery system. Preferably the use of the present dispersants in the battery system allows for higher loading of active materials to be dispersed, which in turn allows for higher energy density to be achieved. This higher active material loading is allowed by virtue of the improved viscosity profile provided by the dispersant versus known alternative dispersants.

The present invention will now be described with reference to the following examples and accompanying Figures in which, FIG. 1. shows viscosity profile data expressed in centipoise for LITX 50 conductive carbon particulate dispersed in NMP solvent comparing as dispersant PVP, high acid value Hypermer KD1 (comparative), and low acid value sample 118 in accordance with the present invention.

Figure 2:
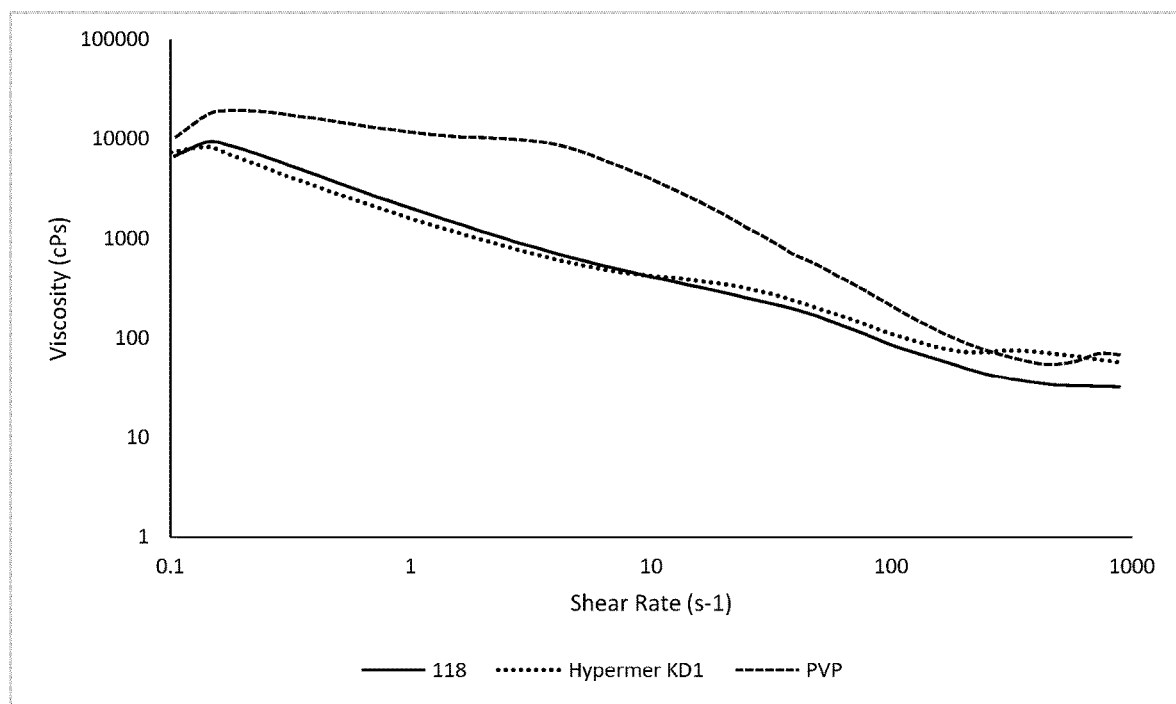

FIG. 2. shows viscosity profile data expressed in centipoise for Super C65 conductive carbon particulate dispersed in NMP solvent comparing as dispersant PVP, high acid value Hypermer KD1 (comparative), and low acid value sample 118 in accordance with the present invention.

Figure 3:
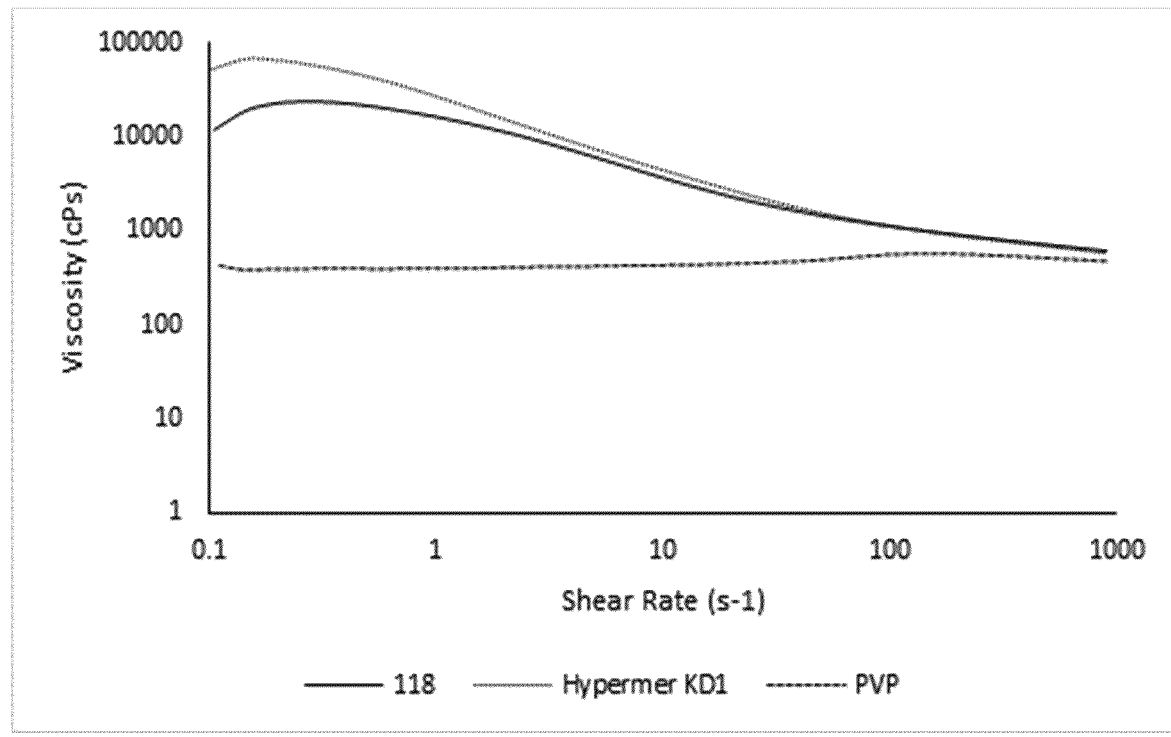

FIG. 3. shows viscosity profile data expressed in centipoise for a simple battery system cathode formulation comparing as dispersant PVP, high acid value Hypermer KD1 (comparative), and low acid value sample 118 in accordance with the present invention.

Figure 4:
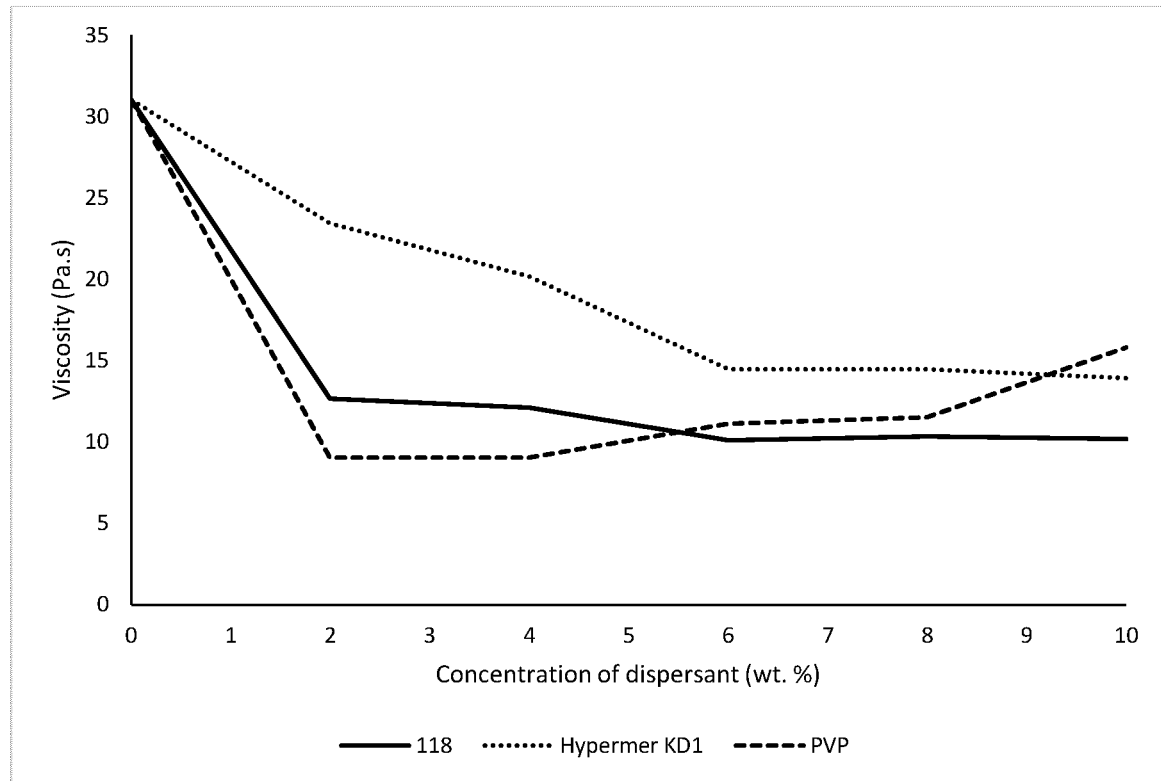

FIG. 4. shows concentration of dispersant data expressed in wt % (weight %) relative to dispersion system viscosity comparing as dispersant PVP, high acid value Hypermer KD1 (comparative), and low acid value sample 118 in accordance with the present invention.

Figure 5:
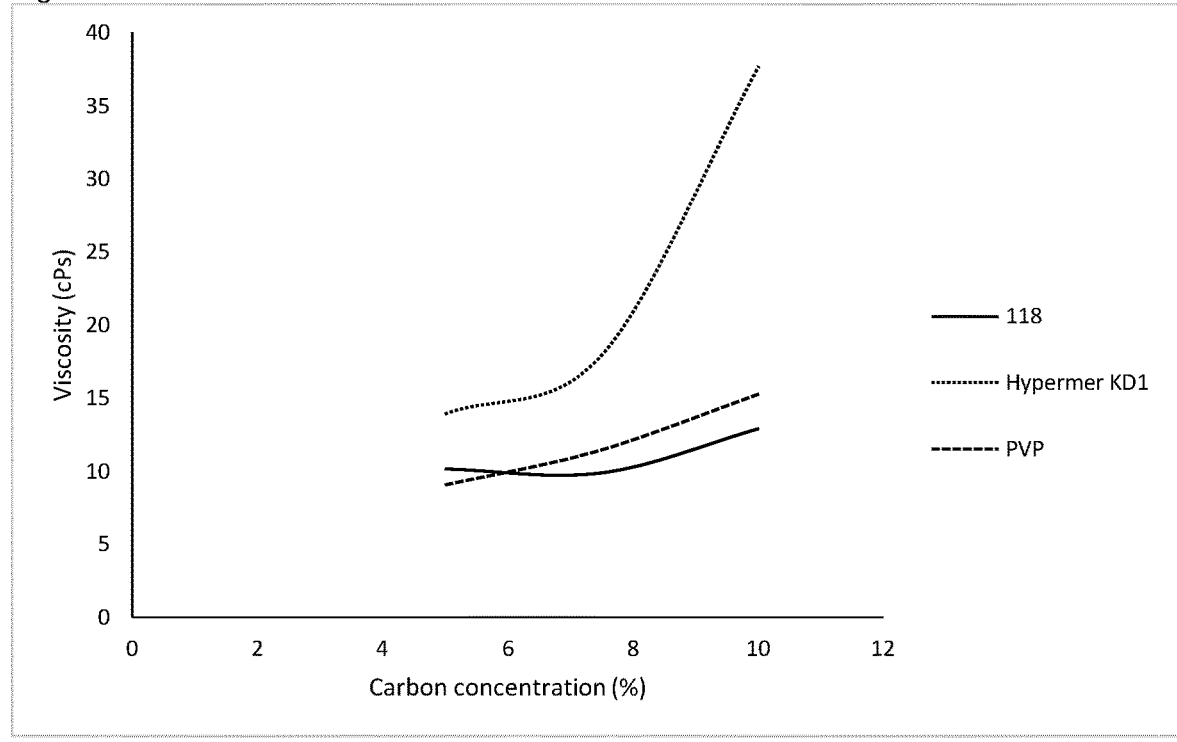

FIG. 5. shows increased carbon concentration data expressed in wt % (weight %) relative to dispersion system viscosity comparing as dispersant PVP, high acid value Hypermer KD1 (comparative), and low acid value sample 118 in accordance with the present invention.

Figure 6:
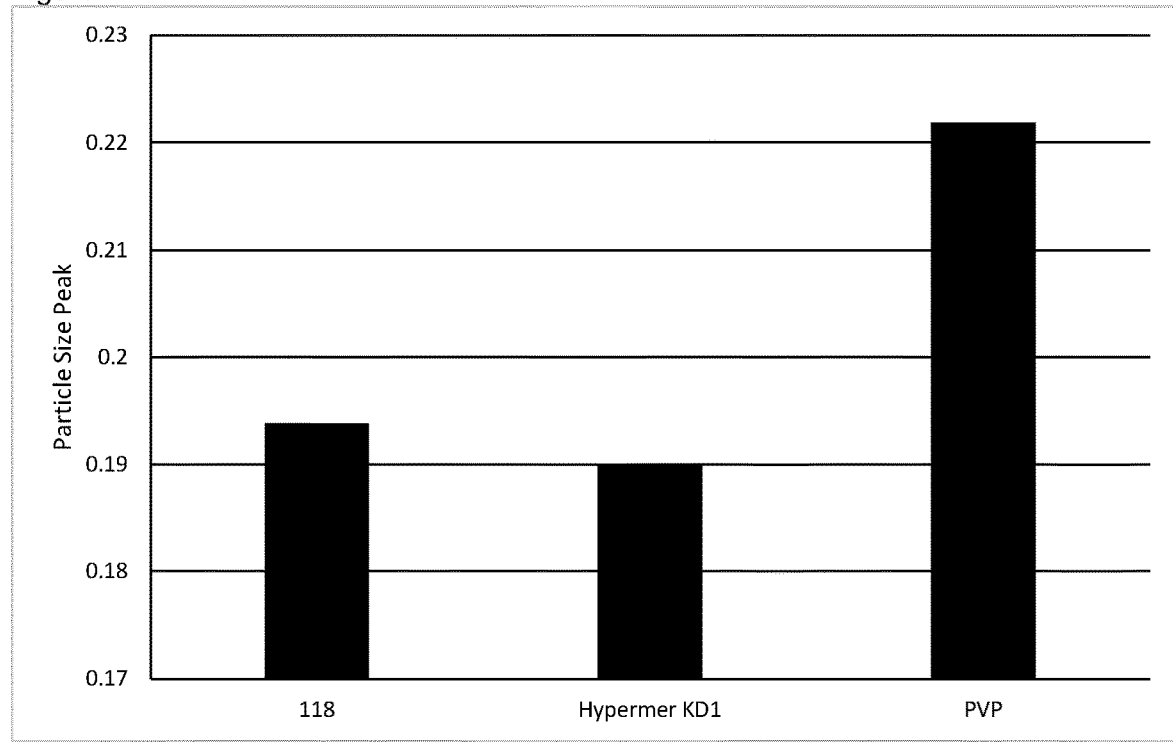

FIG. 6. shows particle size peak data for LITX 50 conductive carbon particulate dispersed in NMP solvent comparing as dispersant PVP, high acid value Hypermer KD1 (comparative), and low acid value dispersant sample 118 in accordance with the present invention.

Figure 7:
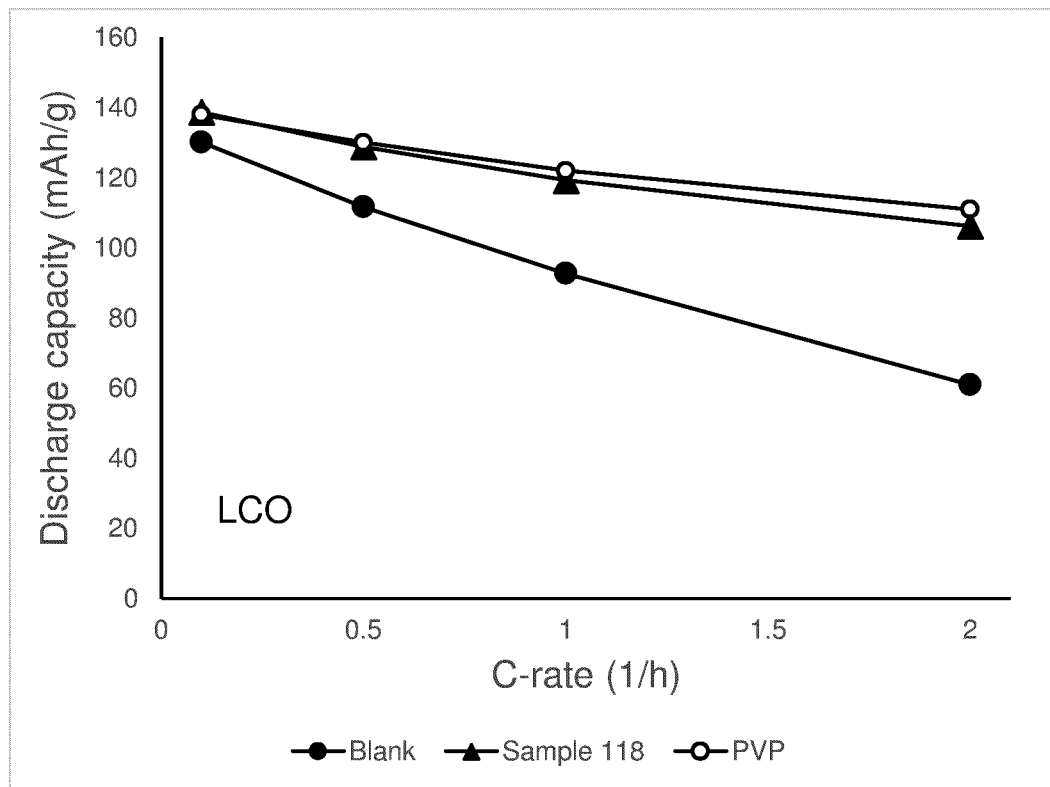

FIG. 7. shows the discharge capacity as a function of C-rate for an LCO-based coin cell comparing a cathode slurry without a dispersant, with PVP as a dispersant, and with the low acid value dispersant sample 118 in accordance with the present invention.

Figure 8:
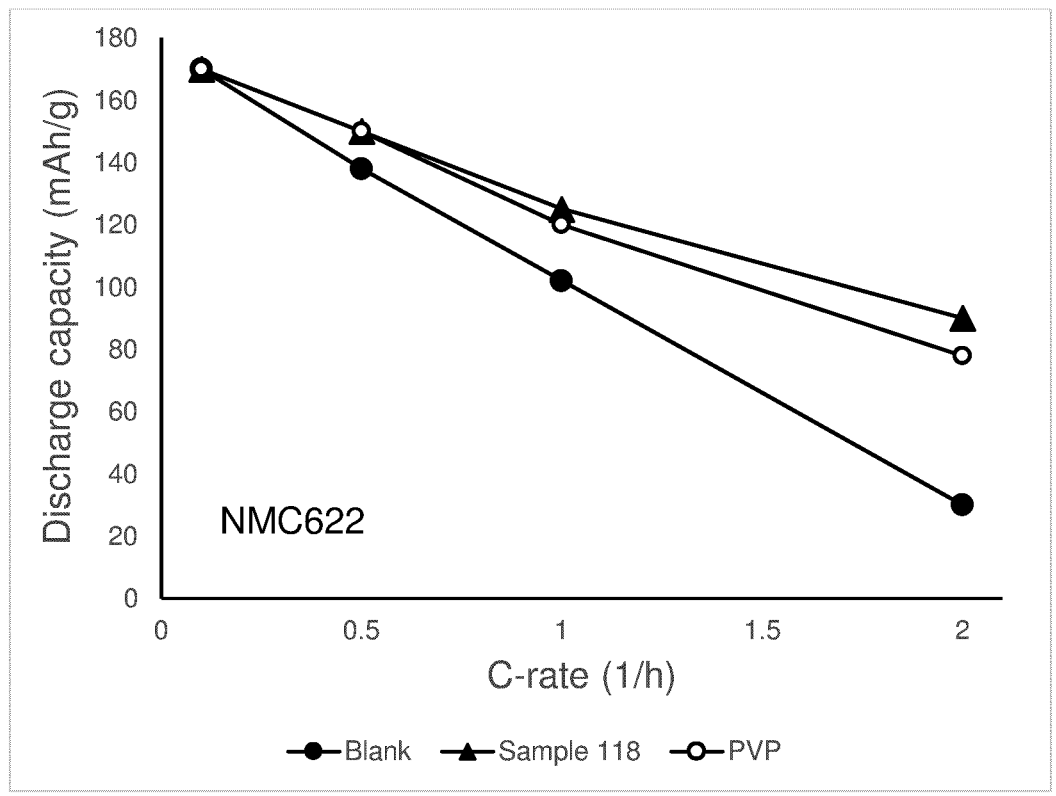

FIG. 8. shows the discharge capacity as a function of C-rate for an NMC622-based coin cell comparing a cathode slurry without a dispersant, with PVP as dispersant, and with the low acid value dispersant sample 118 in accordance with the present invention.

EXAMPLES

In the following examples dispersants were prepared in accordance with the following preparation methods.

For each sample prepared the weight percent of the raw materials used was varied to provide a polyester having a ε-caprolactone:lauric acid ratio as indicated in Table 1 (where appropriate).

bi) Comparative Example—Hypermer KD1 ex. Croda

Hypermer KD1 is a comparative commercially available material. A small scale process, in accordance with the teaching of published patent application number EP 0 158 406 as described below, was performed to provide a chemical equivalent to commercially available Hypermer KD1.

a) Lauric acid, ε-caprolactone and zirconium (IV) butoxide catalyst (used at a level of 0.1 wt %) were charged to a reaction vessel equipped with a nitrogen headspace purge and agitator. The reactants were mixed and heated up to and maintained at a temperature of 180° C. until the reaction was complete (GPC end point determination, <1 wt % of raw materials present in the GPC trace). The reaction product was then cooled to 100° C. and discharged from the reaction vessel.

This product was prepared from a polyester material as prepared as per step a) above (with reference to Table 1), and polyethylenimine which was charged to a reaction vessel equipped with a nitrogen headspace purge. The reactants were mixed and heated up to and maintained at 150° C. until the reaction was complete (acid value in the range of 25-30 mgKOH/g) after approximately 5 hours. The reaction was then cooled to 90° C. and discharged from the reaction vessel. It should be noted, however, that in the tests performed below a commercially available Hypermer KD1 product obtained from a plant batch was tested.

bii) Examples in Accordance with the Present Invention—Method 1

(Table 1 Samples 120, 154A, 154B, 156A, 156B, 158, 159, and 118)

a) Lauric acid, ε-caprolactone and zirconium (IV) butoxide catalyst (used at a level of 0.1 wt %) were charged to a reaction vessel equipped with a nitrogen headspace purge and agitator. The reactants were mixed and heated up to and maintained at a temperature of 180° C. until the reaction was complete (GPC end point determination, <1 wt % of raw materials present in the GPC trace). The reaction product was then cooled to 100° C. and discharged from the reaction vessel.

The polyester materials as prepared in step a) above (with reference to Table 1), and polyethylenimine were charged to a reaction vessel equipped with a nitrogen headspace purge. The reactants were mixed and heated up to and maintained at 175° C. and the reaction was allowed to continue until the desired atypical low acid value was reached (the obtained acid values are indicated in Table 1). The reaction product was then cooled to 90° C. and discharged from the reaction vessel.

bii) Examples in Accordance with the Present Invention—Method 2

(Table 1 Sample 197)

Sample 197 was prepared by an alternative process route, where step a) as described above was not utilised, instead this method concerns an alternative direct PEI initiated polycaprolactone process route.

ε-caprolactone, polyethylenimine and zirconium (IV) butoxide catalyst (used at a level of 0.1 wt %) were charged to a reaction vessel equipped with a nitrogen headspace purge, agitator and condenser set for condensate removal. The reactants were mixed and heated up to and maintained at a temperature of 180° C. until the reaction was complete, in this case this was approximately 3 hours (GPC end point determination was used to establish completion of reaction, <1 wt % of ε-caprolactone present in the GPC trace). The reaction product was then cooled to 100° C. and discharged from the reaction vessel.

For each sample prepared the weight percent of the raw materials used was varied to provide a dispersant containing a polyethylenimine weight percentage as indicated in Table 1.

The polyethylenimine (PEI) materials used are all commercially available, and their relevant weight average molecular weights (MW) are as indicated in Table 1.

Acid values were calculated in accordance with test method AOCS 'Te-1a-64: Acid Value.

TABLE 1

| Sample Name | Ratio of ε-caprolactone:lauric acid | PEI wt % | PEI Molecular Weight (MW) | Acid Value mgKOH/g |
| --- | --- | --- | --- | --- |
| Hypermer KD1 (Comparative) | 10:1 | 7.0 | 10000 | 30.3 |
| 120 | 05:1 | 7.5 | 10000 | 0.7 |
| 154A | 08:1 | 7.5 | 10000 | 0.7 |
| 154B | 12:1 | 7.5 | 10000 | 0.5 |
| 156A | 10:1 | 5.0 | 10000 | 2.1 |
| 156B | 10:1 | 10.0 | 10000 | 0.6 |
| 158 | 10:1 | 7.5 | 25000 | 0.5 |
| 159 | 10:1 | 7.5 | 2000 | 1.0 |
| 118 | 10:1 | 7.0 | 10000 | 0.6 |
| 197 | Not Applicable | 7.0 | 10000 | 1.5 |

PEI Materials utilised are as follows:
2,000 MW material is Lupasol PR8515 ex. BASF
10,000 MW material is Epomin SP200 ex. Nippon Shokubai.
25,000 MW material is Lupasol WF ex. BASF
Testing
1. Dispersion Viscosity Samples of commercially available conductive carbon particulates were dispersed in NMP as solvent in the presence of a dispersant selected from either a benchmark commercially available PVP (ex. Sigma Aldrich molecular weight 20 000), the high acid value comparative sample detailed above (Hypermer KD1), or the low acid example sample 118 as described above.

Two commercially available conductive carbon particulates were tested:

1) LITX 50 ex. Cabot which is a conductive additive utilised in lithium ion batteries for hybrid electric vehicles and high-end consumer electronic devices such as smartphones.
2) Super C65 ex. Imerys Graphite & Carbon which is a conductive additive utilised in lithium ion rechargeable batteries.

An IKA overhead stirrer with a 4-blade propeller stirrer was used to prepare dispersions consisting of the materials detailed above, at ambient temperature. The dispersant was provided at a level of 1 wt. % and the carbon at a level of 5 wt. % of the total dispersion.

The viscosity profiles of the dispersions are shown in FIGS. 1 and 2 for LITX 50 and Super C65 respectively. The viscosity profiles were obtained using a TA Instruments DHR-2 rheometer fitted with a 40 mm stainless steel parallel plate with a gap of 500 micrometres. The low acid value sample in accordance with the present invention provides an improved lower viscosity profile compared to the high acid comparative sample, and even provides some improvements over the PVP benchmark sample when used in combination with Super C65.

In addition, a related simple battery system cathode formulation containing either the commercially available PVP (ex. Sigma Aldrich molecular weight 20 000) benchmark, the high acid value comparative sample, or the low acid sample 118 in accordance with the present invention as detailed above were tested, and the obtained viscosity profiles are shown in FIG. 3. These simple cathode formulations also contained LCO and LITX50 ex. Cabot as the active particulate materials to be dispersed, and the solvent in which they were dispersed was NMP.

In a battery system cathode formulation, it is important to have a low viscosity, coupled with a shear thinning behaviour; this allows the formulation to be easily deposited where required, but then to remain in place once deposited. In the present case the low acid value sample provides a lowered the viscosity profile compared the high acid value sample. This addresses a need identified by battery cell manufacturers who have reported undesirable formulation thickening when utilising the commercially available materials which accord with the high acid value sample. In addition, when compared to the PVP benchmark dispersant, the low acid value sample dispersant provides an improved shear thinning viscosity.

2. Dispersion Performance

The performance of three dispersants, 1. PVP, 2. high acid value Hypermer KD1 (comparative), and 3. low acid value dispersant sample 118 in accordance with the present invention, to disperse LITX 50 conductive carbon in NMP solvent was considered in relation to concentration of dispersant required to achieve acceptable dispersion, loading level of particulate to be dispersed and particle size peak data of particulate dispersed. The results obtained are shown in FIGS. 4 to 6 and discussed below.

Dispersions were made by dissolving the dispersant in NMP by stirring with an overhead stirrer (IKA) equipped with a 4-blade impeller. LITX50 was added and stirring continued until homogeneous.

Viscosity measurements were carried out at 25° C. on a DHR-2 rheometer (TA Instruments) equipped with a 40 mm stainless steel parallel plate. The gap was set to 500 μm and a soak time of 30 seconds was allowed before the measurements were carried out. A flow curve was run logarithmically from a shear rate of 0.1 to 1000 s$^{-1}$. Where specific data points have been used for comparison, these have been taken at 10 s$^{-1}$.

FIG. 4 shows the amount of dispersant required to disperse LITX 50 conductive carbon in NMP solvent at an acceptable viscosity. In this case, it can be seen that only 2 wt % of example sample 118 was required to achieve an acceptable dispersion versus 6 wt % of Hypermer KD1. Furthermore, it can be seen that example sample 118 provides a dispersant concentration similar to that of PVP.

In addition, FIG. 5 shows that higher carbon loadings can be achieved with example sample 118 at a lower viscosity for all carbon loading levels tested as compared to Hypermer KD1. Furthermore, example sample 118 provides beneficial higher carbon loadings compared to PVP. As such, the materials of the present invention allow higher carbon loadings to be achieved for the same viscosity in the solvent system. This higher loading level capability is advantageous for use of the present dispersants in battery systems.

Particle size measurements were carried out on a CPS Disc Centrifuge (CPS Instruments) with 100 μl of particles measured from 1.0 to 0.01 μm at a disc speed of 20 000 rpm. The gradient used was comprised of NMP and Halocarbon 1.8.

FIG. 6 shows the particle size peak data obtained. The particle size peak data shows that the use of the 118 dispersant reduces the particle size as compared to use of PVP; this result is indicative of improved dispersion ability of example sample 118 over PVP. It can be seen that no improvement is provided over Hypermer KD1 (comparative example), however, the low acid value materials of the present invention avoid the viscosity increasing affects observed with use of Hypermer KD1, as discussed above, with no appreciable detriment to dispersion ability as compared to Hypermer KD1. As such, the present material offers benefits over both PVP and Hypermer KD1 which render them particularly suitable for use in battery systems, but also suitable for use in other dispersion systems where viscosity control and increased particulate loading may be attractive.

3. Effect of Dispersant on Capacity in Lithium Ion Coin Cell Batteries

Two commercially available active battery materials were tested to assess the effect of the dispersant sample 118 on capacity of composite cathodes of lithium ion batteries:
1) LCO ex. Gelon typically used in batteries for consumer electronics.
2) NMC622 ex. Gelon which is a Lithium-Nickel-Manganese-Cobalt-Oxide (LiNiMnCoO2) active cathode composite powder typically used for automotive batteries.

The composition of the solid composite cathode materials prepared for the cathode capacity testing is indicated in Table 2, below. The carbon black utilised was commercially available CB grade LITX200 ex. Cabot. The binder utilised was a commercially available polyvinylidene fluoride (PVDF) powder Solef 6010/1001 ex. Solvay. The commercially available PVP dispersant was also tested as an alternative.

TABLE 2

| Composite Cathode Material | Content in wt. % | Content, grams |
|---|---|---|
| Active Cathode Battery Material | 94.63 | 4.000 |
| Carbon Black | 1.99 | 0.084 |
| Dispersant | 0.40 | 0.017 |
| Binder (PVDF) | 2.98 | 0.126 |
| Total | 100.00 | 4.227 |

To prepare the cathode slurries for testing initially the carbon black was pre-dispersed in NMP solvent in a carbon:dispersant ratio 5:1 wt. % using a centrifugal mixer (a Thinky Mixer ARE-310). Subsequently the active cathode battery material (LCO or NMC622) and the PVDF binder were added to the initial carbon black dispersion and mixed for one hour in a SPEX—8000M ball mill. The final slurries contained 67 wt % solid composite cathode material loaded into 33 wt % NMP solvent.

A cathode slurry containing no dispersant (blank) was also prepared as a reference sample to be tested.

The cathode slurries to be tested where rendered as cathode layers in coin cells to be tested by providing a layer of the cathode slurry on battery-grade aluminium foil using a doctor blade applicator and subsequent drying at 110° C. in a vacuum oven. After drying, cathode discs were cut from the coated film using a high-precision disc puncher and the discs transferred into an argon-filled glovebox with an oxygen and moisture content of less than 1 ppm. 2032-type coin cells were assembled inside the glove box using the prepared cathode discs and lithium metal as a reference/counter electrode, porous polypropylene separator and commercial 1 M LiPF6 electrolyte solution in ethylene carbonate/diethyl carbonate 50/50 v/v. The prepared coin cells were left to rest for 12 hours prior to electrochemical testing. The coin cells were galvanostatically cycled five times in the potential ranges 3.2-4.2 V vs. Li/Li+ (LCO) and 3.0-4.3 V vs. Li/Li+ (NMC622) at currents corresponding to 0.1 C-rate for formation using a battery cycling setup. Then, cycling was carried out at 0.5 C, 1.0 C and 2.0 C (five charge-discharge cycles at each C-rate) using the same potential ranges. Capacity at each C-rate was calculated as an average over five cycles.

FIGS. 7 and 8 show the rate performance data (discharge capacity versus C-rate) of the coin cells containing LCO and NMC622 cathode active materials, respectively. Both graphs also show the results obtained for the blank samples (i.e. containing no dispersant) for comparison versus where PVP or Sample 118 are included as a dispersant. It can be seen that for both active battery material chemistries tested, using the carbon dispersant resulted in an increase of capacity; and the advantageous effect is greater at higher discharge rates. Improved capacity retention at a high rate is an indication of a more uniform dispersion and better coverage of the active material by particles of carbon.

The invention claimed is:

1. A dispersant comprising:
a polyester derived from a plurality of poly(carbonylalkyleneoxy) chains and an amine,
wherein the dispersant has an acid value of less than 1 mgKOH/g, and an amine value of less than 30 mgKOH/g.

2. The dispersant according to claim 1, wherein the dispersant comprises a fatty acid selected from one or more of the following: oleic acid, caproic acid, lauric acid, stearic acid and palmitic acid.

3. The dispersant according to claim 1 wherein the plurality of poly(carbonylalkyleneoxy) chains contains an alkylene group having between 3 and 12 carbon atoms.

4. The dispersant according to claim 3, wherein the alkylene group contains between 4 and 8 carbon atoms.

5. The dispersant according to claim 2, wherein a ratio of the plurality of poly(carbonylalkyleneoxy) chains to the saturated fatty acid is between 4:1 and 15:1.

6. The dispersant according to claim 1, wherein the amine is a poly(alkylenimine).

7. The dispersant according to claim 6, wherein the poly(alkylenimine) is polyethylenimine.

8. The dispersant according to claim 6, wherein the poly(alkylenimine) has a weight average molecular weight in the range of 1000 to 50000.

9. The dispersant according to claim 1, wherein the dispersant comprises at least 5 wt % (weight percent) amine and optionally no more than 35 wt % amine.

10. The dispersant according to claim 1, wherein the dispersant has a weight loss of less than 20% at 350° C.

11. A method of manufacturing a dispersant in accordance with claim 1, the method comprising the following steps:
a) preparing a polyester from the polymerisation reaction of a plurality of poly(carbonylalkyleneoxy) chains and optionally a fatty acid,
b) providing an amine and allowing the polyester of step a) to react with the amine to form an intermediate reaction product, and,
c) reducing the acid value of the intermediate reaction product of step b).

12. The method of manufacturing a dispersant according to claim 11, wherein the polymerisation reaction of step a) is performed in the presence of a polymerisation catalyst.

13. The method of manufacturing a dispersant according to claim 12, wherein the polymerisation catalyst is selected from the following: titanium (IV) butylate, zirconium (VI) butoxide, zinc acetate and toluenesulfonic acid.

14. The method of manufacturing a dispersant according to claim 11, wherein the polymerisation reaction of step a) is performed at a temperature of between 130° C. and 250° C.

15. The method of manufacturing a dispersant according to claim 11, wherein step b) has a reaction time of between 14 and 24 hours.

16. The method of manufacturing a dispersant according to claim 11, wherein in step c), the reduction in acid value of the intermediate reaction product, is achieved (or assisted) by the introduction of an acid scavenger.

17. A dispersion comprising a continuous phase, a particulate to be dispersed and a dispersant in accordance with claim 1.

18. The dispersion according to claim 17, wherein the continuous phase comprises a solvent.

19. The dispersion according to claim 18, wherein the solvent is N-methyl-2-pyrrolidone (NMP).

20. The dispersion according to claim 17, wherein the particulate to be dispersed is a particulate battery active material selected from one or more of the following: conductive carbon, lithium nickel manganese cobalt oxide (NMC, $LiNi_xMn_yCo_zO_2$), lithium manganese oxide (LMO, $LiMn_2O_4$), lithium iron phosphate (LFP, $LiFePO_4$), lithium cobalt oxide (LCO, $LiCoO_2$), and lithium nickel cobalt aluminium oxide (NCA, $LiNiCoAlO_2$).

21. The dispersion according to claim 20 comprising an amount of particulate to be dispersed of between 60 wt % and 99.9 wt % of the total dispersant.

22. The dispersion according to claim 17, further comprising an additional additive selected from one or more of binders, adhesion promoters, wetting agents, and corrosion inhibitors.

23. A battery system comprising a dispersion in accordance with claim 17.

* * * * *